Feb. 23, 1971 L. E. WUELLNER ET AL 3,565,536
APPARATUS FOR DETECTING FLAWS IN LIGHT TRANSMISSIVE
TUBING INCLUDING A PLURALITY OF DIAMETRICALLY
OPPOSED LIGHT SOURCES
Filed Jan. 15, 1968 4 Sheets-Sheet 4
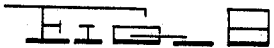
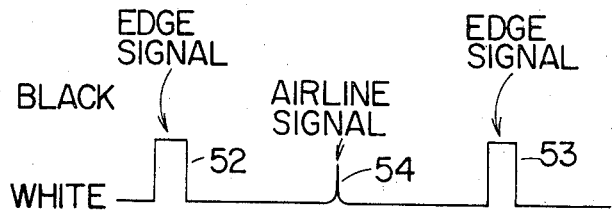
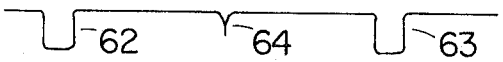
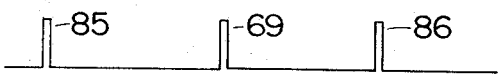
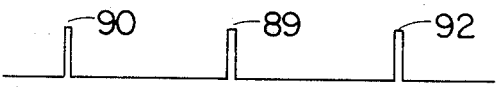
INVENTORS
LOUIS E. WUELLNER
FRANCIS J. KITRUSH
DONALD HOLLOWAY
SALEEM N. BONAHOOM
BY *Hood, Gust & Irish*
ATTORNEYS United States Patent Office 3,565,536
Patented Feb. 23, 1971

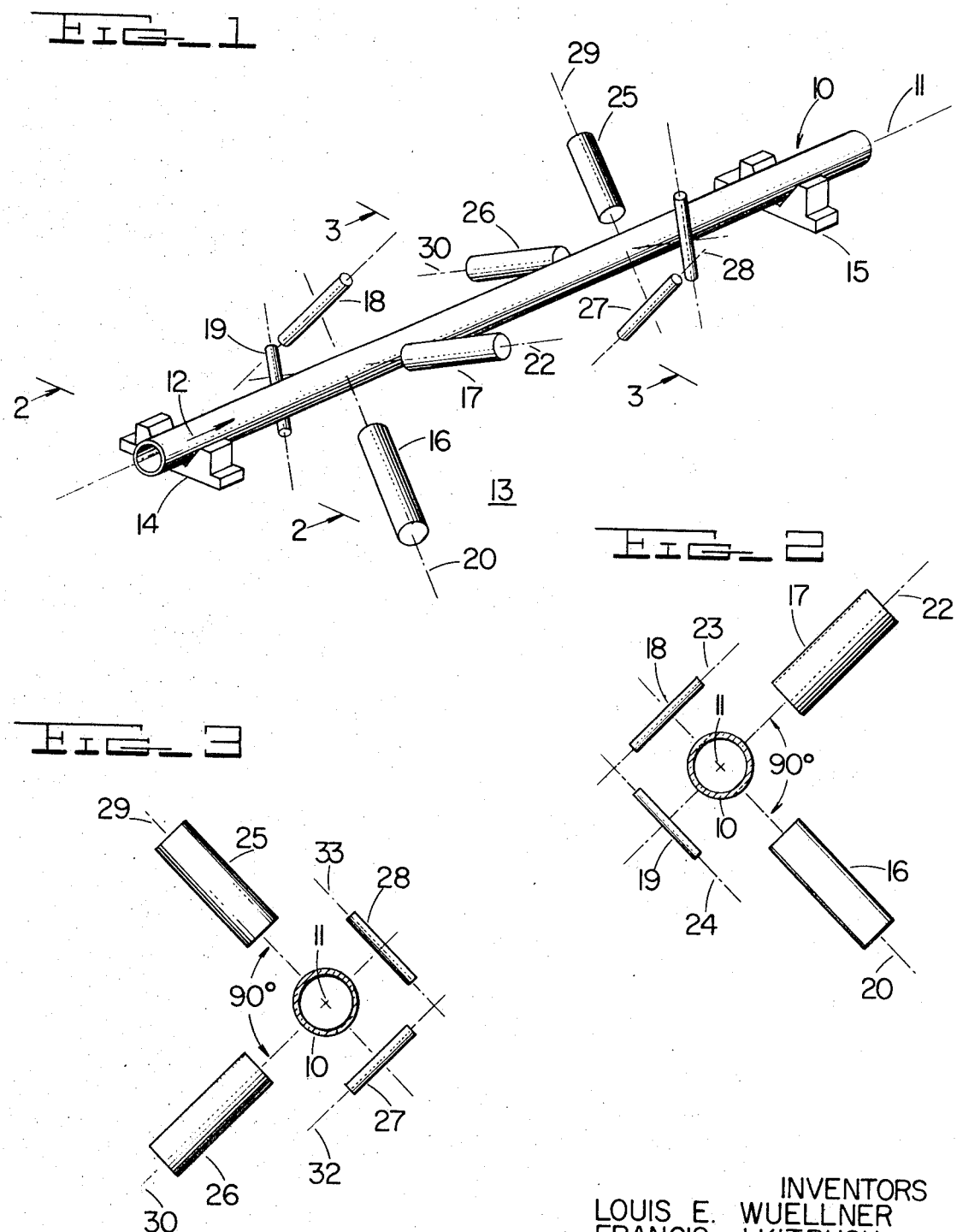

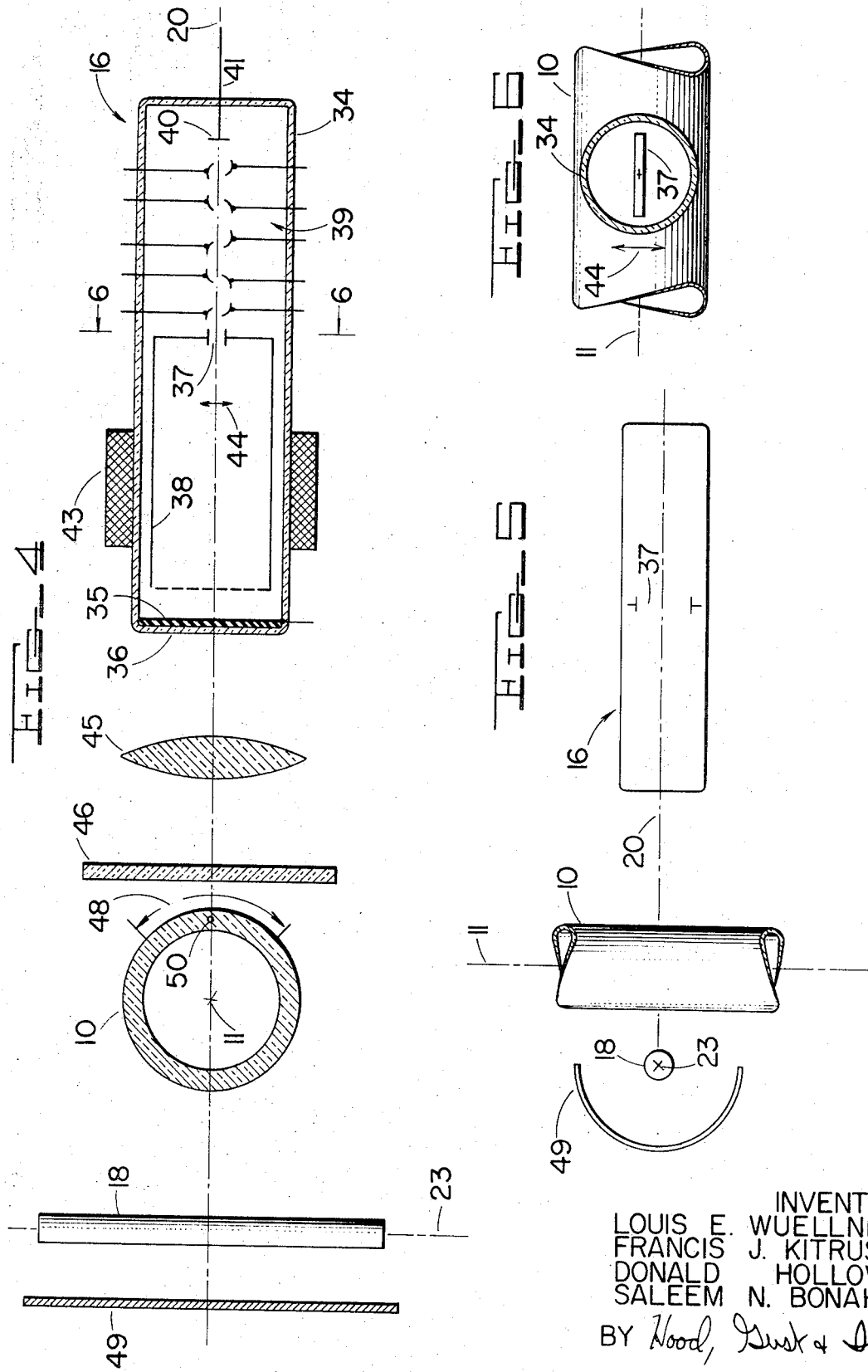

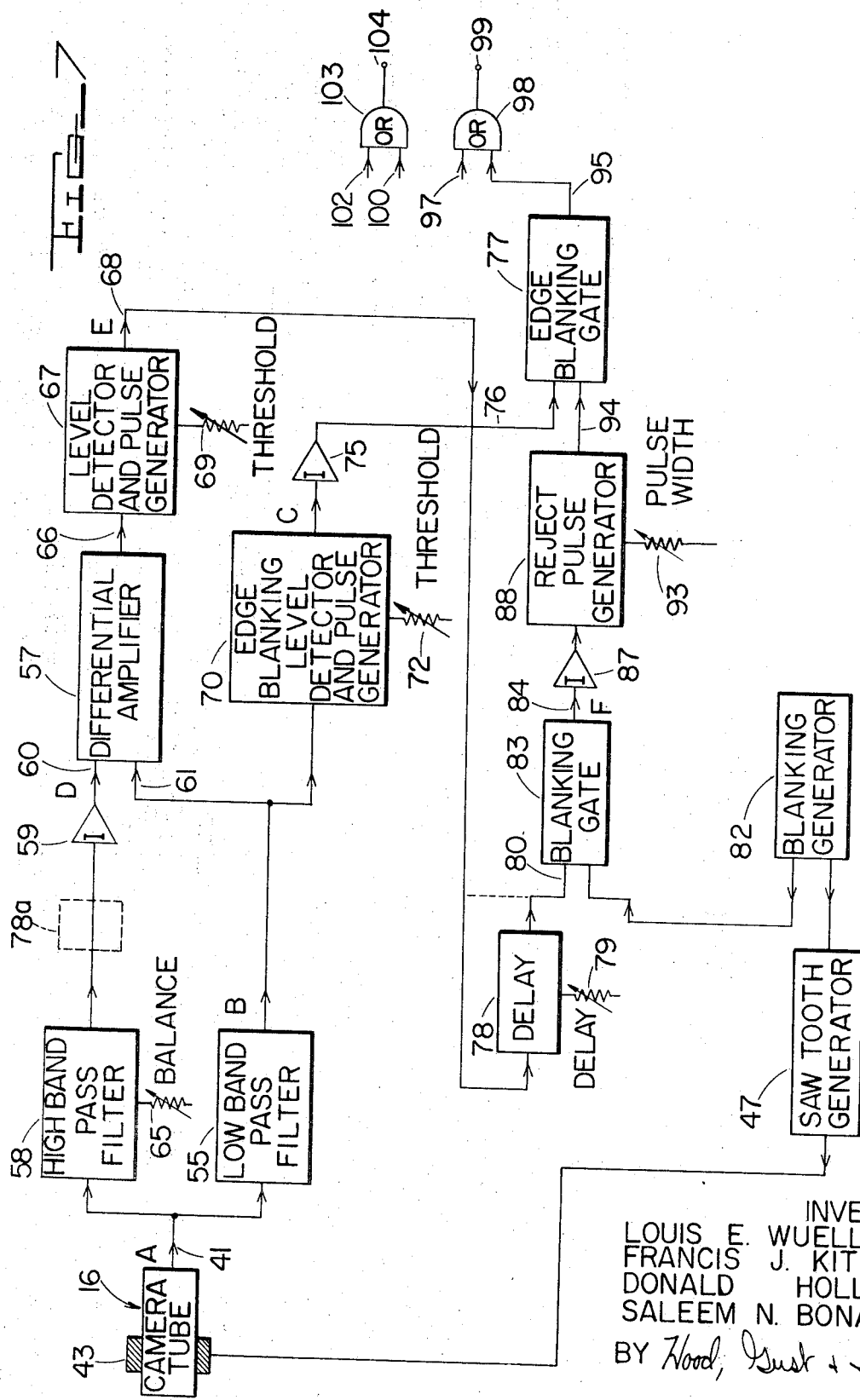

3,565,536
APPARATUS FOR DETECTING FLAWS IN LIGHT TRANSMISSIVE TUBING INCLUDING A PLURALITY OF DIAMETRICALLY OPPOSED LIGHT SOURCES
Louis E. Wuellner and Francis J. Kitrush, Fort Wayne, Donald Holloway, Decatur, and Saleem N. Bonahoom, Fort Wayne, Ind., assignors to International Telephone and Telegraph Corporation, a corporation of Delaware
Filed Jan. 15, 1968, Ser. No. 697,657
Int. Cl. G01n 21/32
U.S. Cl. 356—239
14 Claims

ABSTRACT OF THE DISCLOSURE

An apparatus for continuously detecting air lines in glass tubing which is moving in its longitudinal direction. Four image dissector camera tubes are provided, each having a light source associated therewith. Each respective camera tube and light source is disposed on a light axis extending transversely through the longitudinal axis of the glass tubing, the camera tube being disposed to view one side of the tubing and the light source being disposed on the other side. Each camera tube has an elongated narrow aperture standing in a direction parallel with the glass tubing axis and is arranged for scanning in a direction perpendicular to the aperture. The light source is arranged completely and grossly to illuminate the glass tubing with diffuse, visible light in an area longer than the scan provided by the camera tube and wider than the width of the aperture when optically projected through the glass tubing to the light source. The first two of the camera tubes and light sources are arranged with their respective light axes lying in a common plane and angularly displaced by ninety degrees. The other two camera tubes and light sources are disposed with their light axes in another common plane longitudinally spaced from the plane of the first two camera tubes and light sources, the light axes of the second two tubes and light sources likewise being angularly displaced by ninety degrees, each of the camera tubes being arranged to view a different quadrant of the peripheral surface of the glass tubing.

BACKGROUND OF THE INVENTION

Field of the invention

This invention relates generally to apparatus for detecting flaws in a light transmissive article, and more particularly to apparatus for detecting air lines in glass tubing.

Description of the prior art

In the process of drawing glass tubing from the molten glass, it is possible to have an occluded air bubble in the molten glass which, when the tubing is drawn, stretches out into a long thin line, referred to as an "airline." Such airlines may be from a half inch to a thousand feet long and from .001 inch to .005 inch in width. A common use for larger diameter glass tubing, i.e., from one to two inches in diameter, is for the necks of cathode ray tubes. The presence of an airline in glass tubing substantially reduces the dielectric strength and thus, if the neck of a cathode ray tube has an airline therein, by reason of the high voltages employed both during operation of the tube and during its production testing, an arc can occur through the airline which renders the tube unusable.

It is thus necessary to inspect glass tubing used for cathode ray tube necks for airlines. In the past, this inspection has been performed visually after the glass tubing has been cut to the desired short lengths. Such visual inspection not only has been time consuming, but further, fine airlines are difficult to detect visually and thus frequently escaped detection in the visual inspection operation.

It is thus desirable to provide apparatus for automatically and continuously inspecting glass tubing for airlines as the tubing exits from the drawing apparatus, such apparatus not relying upon visual inspection.

SUMMARY OF THE INVENTION

An apparatus for detecting flaws in an article which has a longitudinal axis, a substantially uniform cross-sectional configuration transverse to its axis throughout its length, a substantially smooth longitudinally extending peripheral surface and which is light transmissive in a given spectrum. The apparatus includes means for illuminating at least a longitudinal portion of the entire peripheral surface of the article with diffuse light of the spectrum to which the article is light transmissive and including at least one light source disposed on one side of the article. Means are provided including at least one light level sensing means disposed on the other side of the article for receiving light transmitted therethrough from the source and providing an output signal responsive to the brightness level. Means are provided for imparting longitudinal and transverse scanning motion to the article relative to the light source and sensing means so that a flaw signal is provided in the output signal in response to a flaw in the article which causes a reduction in the brightness level of the light received by the light sensing means.

In the preferred embodiment of the invention, the longitudinal scanning motion is provided by longitudinal movement of the article and the light sensing means is a camera tube having means for scanning in a direction substantially perpendicular to the horizontal axis of the article thereby providing the transverse scanning motion. In further accordance with the preferred embodiment of the invention, where the article has an elongated cylindrical peripheral surface, four camera tube means and light sources are employed, each camera tube means viewing a different quadrant of the peripheral surface of the article.

It is accordingly an object of the invention to provide apparatus for detecting flaws in a light transmissive article.

Another object of the invention is to provide apparatus for detecting airlines in glass tubing.

A further object of the invention is to provide an apparatus for automatically and continuously detecting flaws in an elongated, longitudinally moving, light transmissive article.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a schematic view in perspective illustrating the apparatus of the invention;

FIG. 2 is a fragmentary cross-sectional schematic view taken generally along line 2—2 of FIG. 1;

FIG. 3 is a fragmentary, cross-sectional schematic view taken generally along the line 3—3 of FIG. 1;

FIG. 4 is an enlarged, cross-sectional, schematic view showing one of the camera tubes and light sources of the apparatus of the invention;

FIG. 5 is an enlarged, top schematic view of the camera tube and light source of FIG. 4;

FIG. 6 is a fragmentary cross-sectional view taken generally along the line 6—6 of FIG. 4;

FIG. 7 schematically illustrates the circuitry associated with one of the camera tubes employed in the apparatus of the invention; and FIG. 8 is a timing diagram useful in explaining the mode of operation of the circuitry of FIG. 7.

DESCRIPTION OF THE PREFERRED EMBODIMENT

Referring now to FIGS. 1, 2, and 3, there is shown at 10 a segment of elongated, cylindrical glass tubing having a longitudinal axis 11 and which is moving longitudinally in the direction shown by the arrow 12. The segment 10 of the tubing may be at a location closely adjacent the apparatus by which the tubing was drawn from molten glass, and thus the segment 10 may be at a relatively elevated temperature, i.e., a high as 450° centigrade.

The airline inspection apparatus of the invention, generally indicated at 13, includes a pair of V-supports 14 and 15 for supporting the tubing 10, the supports 14 and 15 being longitudinally spaced apart. The airline inspection, to be hereinafter described, is performed in the zone between the supports 14 and 15 as the tubing is moving in direction 12.

A first pair of camera tubes 16 and 17 is provided respectively having light sources 18 and 19 associated therewith. Camera tube 16 and light source 18 are oriented on a light axis 20 which extends transversely through the longitudinal axis 11 of the tubing 10, camera tube 16 being disposed on one side of the tubing so as to view that side, and light source 18 being disposed on the other side so as to illuminate that side, i.e., the light received by the camera tube 16 from the light source 18 passes through the tubing 10. Similarly, camera tube 17 and its light source 19 are disposed on another light axis 22 which also extends transversely through the longitudinal axis 11 of the tubing 10. Light axes 20 and 22 lie in a common plane which is normal to the longitudinal axis 11 and the light axes 20 and 22 are angularly displaced in that plane by ninety degrees so that the camera tubes 16 and 17 respectively view adjacent ninety-degree quadrants of the peripheral surface of the tubing 10.

The light sources 18 and 19 are elongated tubes, such as fluorescent tubes, and respectively have axes 23 and 24 which lie in the same common plane as the plane of the light axes 20 and 22, and which are respectively perpendicular to the light axes 20 and 22.

Another pair of camera tubes 25 and 26 are provided respectively associated with light sources 27 and 28 and being respectively oriented therewith on light axes 29 and 30 which respectively pass transversely through the longitudinal axis 11 of tubing 10. Again, each of the camera tubes 25 and 26 is disposed on one side of the tubing 10 and the respective light sources 27 and 28 are disposed on the other side so that the camera tubes 25 and 26 respectively receive light from their respective light sources through the tubing. Light axes 29 and 30 lie in a second common plane normal to the longitudinal axis 11 of the tubing 10 and longitudinally spaced from the first common plane of light axes 20 and 22. Light axes 29 and 30 are again angularly displaced by ninety degrees. Light sources 27 and 28 again are elongated tubes, such as fluorescent tubes, respectively having axes 32 and 33 lying in the same common plane as the light axes 29 and 30 and respectively perpendicular to the light axes 29 and 30. Thus, camera tubes 25 and 26 respectively view adjacent ninety-degree quadrants of the peripheral surface of the tubing 10.

Light axes 20 and 29 lie in a third common plane which includes longitudinal axis 11 with camera tubes 16 and 25 being respectively disposed on diametrically opposite sides of tubing 10. Likewise, light axes 22 and 30 lie in a fourth common plane which includes longitudinal axis 11, the camera tubes 17 and 26 likewise being disposed on diametrically opposite sides of the tubing. Thus, each of the camera tubes 16, 17, 25 and 26 views a different ninety-degree quadrant of the peripheral surface of the tubing 10.

Referring now to FIGS. 4, 5 and 6, one of the camera tubes 16 and its associated light source 18 will be described in greater detail, it being understood that the other camera tubes and light sources are identical. An image dissector-type of camera tube 16 is employed, and in a specific embodiment of the invention, a vidissector tube, catalog No. F4011 manufactured by the assignee of this application, is employed. The camera tube 16 has an enclosing envelope 34, a conventional photocathode 35 formed on its face plate 36, a defining aperture 37 formed at the rear end of a drift tube 38, and a photo multiplier section 39 having an output anode 40 coupled to output circuit 41. With the exception of the configuration of the defining aperture 37, the image dissector tube 16 is conventional and its mode of operation need not be further described.

A single deflection yoke 43 is provided arranged to deflect the electron image provided by the photocathode 35 over the defining aperture 37 in a direction perpendicular to light axis 20 and the longitudinal axis 11 of the tubing 10 as shown by the arrows 44. In accordance with the invention, the defining aperture 37 is an elongated, narrow slit extending parallel with the longitudinal axis 11 of the tubing 10.

Face plate 36 of the camera tube 16 is spaced along light axis 20 from the tubing 10 with suitable optics 45 being provided therebetween for focusing the image of the peripheral surface of tubing 10 onto the photocathode 35. In the specific embodiment of the invention wherein the tubing 10 is at an elevated temperature, a light-transmissive heat shield 46 is provided between the tubing 10 and the optics 45, Vicor glass being suitable. Scanning yoke 43 is coupled to a conventional saw tooth sweep generator 47 (FIG. 7) and the yoke 43 and sweep generator 47 are arranged to scan a ninety-degree quadrant 48 of the peripheral surface of the tubing 10, quadrant 48 being bisected by the light axis 20.

The light provided by light source 18 thus completely and grossly covers the field of view of the aperture 37 when projected to the plane of the tube 18. Thus, tube 18 is disposed closely adjacent the tubing 10 and illuminates the tubing with an area of diffuse light which is longer than the scan provided by the camera tube 16 and wider than the width of the defining aperture 37 when optically projected through the tubing 10 to the tube 18. Tube 18 must thus be axially longer than the diameter of the glass tubing 10 and in order to concentrate the diffuse light provided by the tube 18, a suitable reflector 49 is provided formed of suitable material, such as polished aluminum there being, however, no intention to parallel or focus the light provided by the tube 18 with the reflector 49. In the specific embodiment of the invention for detecting airlines in clear glass tubing having a diameter from one to two inches, a commercially available F8T5 "day light" fluorescent lamp was found to be satisfactory, an S–11 phosphor being employed for the photocathode 35 of the camera tube 16. It will be readily understood that in the case of the inspection of articles having different light transmissive characteristics, a light source having different spectral content and a correspondingly different phosphor would be employed.

Referring particularly to FIG. 4, a typical airline is shown at 50. The airline is a minute, elongated hole or void which acts as high power negative lens. Thus, the airline has less light transmissivity than the surrounding body of glass. Thus, the brightness level of the fuse light transmitted through the tubing 10, as viewed by the camera tube 16 during its scanning operation, is reduced causing a corresponding modulation in the output signal appearing in the output circuit 41. A large airline will produce the same output signal as two parallel black lines on the peripheral surface of the tubing 10, however, most airlines will be viewed by the camera tube as a single black line. It is important that the light provided by the tube 18 be free from flicker. Thus, in the specific embodiment, the fluorescent lamps are energized by direct current with suitable ballasting and filtering, and with the polarity being periodically reversed.

The linear speed of the tubing 10 in the direction 12 is not critical and in the specific embodiment, the linear speed is in the range of 1200 to 3400 inches per minute.

It will be readily understood that the light transmissive properties of the tubing 10 are dependent upon its reflective characteristics. Since the quadrant 48 of the peripheral surface of the tubing 10 which is scanned by the camera tube 16 is convexed, as viewed from the light source 18, the refractive characteristics adjacent the extremities of the quadrant 48 differ from those more adjacent the light axis 20. Resultantly, the brightness level of the light transmitted through the tubing 10 adjacent the extremities of the quadrant 48 is lower than adjacent the light axis 20, so that, again, the appearance of black lines is provided at the extremities of the quadrant 48 thus providing black edge signals in the output signal provided in the output circuit 41. It is therefore necessary to eliminate these edge signals which otherwise would provide an erroneous indication of an airline. Referring momentarily to FIG. 8A, the vidissector output signal is normally white-negative with the edge signals being relatively wide "black" pulses, as shown at 52, 53, while an airline signal is a relatively narrow "black" signal, as shown at 54.

Referring now to FIG. 7, there is shown the output circuitry for the camera tube 16, it being understood that identical output circuitry is provided for the other three camera tubes 17, 25 and 26. Output circuit 41 of the camera tube 16 is coupled by a conventional low-band pass filter 55 to one input circuit 61 of a differential amplifier 57. The low band pass filter 55 passes the relatively wide edge signals 52, 53 and unwanted shading signals caused by the dissector tube which have relatively low frequency components while rejecting the relatively narrow airline signal 54 which has relatively high frequency components, as shown at 56a and 56b in FIG. 8B. In the specific embodiment of the invention, a 5 kc. filter was employed for the low band pass filter 55.

Output circuit 41 of the camera tube 16 is also coupled by a high band pass filter 58 and inverter 59 to the other input circuit 60 of the differential amplifier 57. High band pass filter 58 must pass the relatively narrow, high frequency airline signals 54 without passing too much noise. High band pass filter 58 thus passes both the relatively wide, low frequency edge signals 52 and 53 and the relatively narrow, high frequency airline signal 54, the signals being inverted by inverter 59, as shown at 62, 63 and 64 in FIG. 8D. In the specific embodiment, a 50 kc. band pass filter was employed for the high band pass filter 58. High band pass filter 58 is provided with a suitable balancing network 65 in order to balance the amplitudes of the signals respectively applied to the input circuits 60 and 61 of the differential amplifier 57.

The signals passed by the high band pass filter 58, as inverted by the inverter 59, and passed by the low band pass filter 55 are subtracted by the differential amplifier 57 which thus eliminates the low frequency signals leaving only narrow, high frequency edge dark line signals and the narrow, high frequency airline signals. It will be readily understood that a conventional inverting operational amplifier may be employed for the differential amplifier 57 thus eliminating the need for the inverter 59.

Output circuit 66 of the differential amplifier 57 is coupled to a conventional level detector and pulse generator 67, which may be a conventional Schmitt trigger having a threshold-level control network 69. The level detector and pulse generator 67 thus provides in its output circuit 68 fixed amplitude flaw pulses 69 and edge dark line pulses 85 and 86, as shown in FIG. 8E.

In order to generate blanking pulses which will be employed to eliminate the edge dark line pulses, the output circuit of the low band pass filter 55 is coupled to another conventional level detector and pulse generator 70, which may be a conventional Schmitt trigger having a threshold level control network 72. Level detector 70 thus generates in its output circuit fixed amplitude blanking pulses 73 and 74 in response to the filtered edge signals 56a and 56b, as shown in FIG. 8C, these pulses being inverted by the inverting circuit 75. Threshold level control 72 is provided to blank as much of the edge dark line pulses as possible without also blanking out the flaw pulses which occur nearer the dark line.

It is necessary to blank out all retrace and edge dark line pulses and to generate a reject pulse whenever an airline is detected. It will be recognized that there are differences in the signal delay provided between the video channel, comprising the high band pass filter 58, differential amplifier 57 and level detector 67, on the one hand, and the edge blanking channel comprising the low band pass filter 55 and the level detector 70 on the other hand, and furthermore, it is necessary that the edge dark line pulses 85 and 86 be delayed sufficiently so that they can be blanked by the blanking pulses 73 and 74. This delay is provided by a suitable delay circuit 78, which may be a conventional one-shot multivibrator which is triggered by the leading edge of each positive-going video pulse 69, 85 and 86. The length of the resulting output pulses in output circuit 80 of the one-shot delay multivibrator 78 is determined by the delay control network 79. The output of the one-shot multivibrator 78 thus consists of positive going pulses of fixed length. The same delay may be provided by coupling the delay circuit between the high band pass filter 58 and differential amplifier 57, as shown in dashed lines at 78a.

Retrace and blanking pulse generator 82 is coupled to actuate the saw tooth sweep generator 47 and is also coupled to blanking gate 83 along with output circuit 80 of the delay circuit 78. Blanking gate 83 thus eliminates any video pulses which may occur during scanning retrace. The output signal in output circuit 84 of the blanking gate 83 thus contains only the delay flaw pulses 89 and edge dark line pulses 90 and 92, as shown in FIG. 8F, which are all positive-going. These pulses are inverted by inverter 87 and applied to reject pulse generator 88 which may be a one-shot multivibrator triggered by the positive-going trailing edge of the inverted pulses in the output of the inverter 87, the length of these pulses being determined by pulse width control 93.

The edge blanking pulses 73, 74 provided in the output circuit of the edge blanking level detector and pulse generator 70, as inverted by the inverting circuit 75, are applied to the input circuit 76 of the edge blanking gate 77. The flaw pulses and edge dark line pulses provided in the output circuit 94 of the reject pulse generator 88 are likewise applied to the edge blanking gate 77. Edge blanking gate 77 is gated "off" by the inverted edge blanking pulses 73 and 74 which therefore blanks-out the edge dark line pulses 90 and 92, leaving only the positive-going reject pulse in its output circuit 95.

The output reject pulses thus provided from the camera tube 16 are combined with the reject pulses provided in output circuit 97 of camera tube 17 by a conventional OR circuit 98 and are thus applied to a common output channel 99. Similarly, the output reject pulses in the output circuit 100 of the control circuit associated with camera tube 25, and in the output circuit 102 associated with the camera tube 26, are combined by OR circuit 103 in a common output channel 104.

The presence of a reject pulse in the output channel 99 thus indicates that an airline has been detected in the 180 degree segment of the peripheral surface of the tubing 10 collectively viewed by the camera tubes 16 and 17, while the presence of a reject pulse in the output channel 104 indicates that an airline has been detected in the remaining 180 degree segment of the peripheral surface of the tubing 10 collectively viewed by the camera tubes 25 and 26. These reject signals may be employed merely to light appropriate signal lights or to actuate a suitable alarm, or may be coupled by other actuating circuitry (not shown) to apply a suitable mark on the surface of the tubing 10 in the region where the airline was detected.

While there have been described above the principles of this invention in connection with specific apparatus, it is to be clearly understood that this description is made only by way of example and not as a limitation to the scope of the invention.

What is claimed is:

1. Apparatus for detecting flaws in an article which has a longitudinal axis, a substantially uniform cross-sectional configuration transverse to said axis throughout its length, a substantially smooth longitudinally extending peripheral surface, and which is light transmissive in a given spectrum, said apparatus comprising: a plurality of light sources disposed around said article at different peripheral postions to illuminate different angular portions around the entire peripheral surface of said article with diffuse light of said spectrum; a plurality of light level sensing means disposed at the opposite peripheral sides of said article from respective said light sources for receiving light transmitted therethrough and providing an output signal responsive to the brightness level thereof; means for providing longitudinal scanning motion of said article relative to said light sources and sensing means, and means for providing a transverse scanning motion of said article whereby a flaw signal is provided in said output signal in response to a flaw in said article which causes a reduction in the brightness level of the light received by said sensing means.

2. The apparatus of claim 1 wherein said longitudinal scanning motion is provided by longitudinal movement of said article.

3. The apparatus of claim 1 wherein said light sensing means comprises camera tube means having means for scanning in a direction substantially perpendicular to said longitudinal axis thereby providing said transverse scanning motion.

4. The apparatus of claim 1 wherein said article is cylindrical glass tubing, and wherein there are four of said light sources and four of said light sensing means, first and second ones of said sources and first and second ones of said light sensing means being respectively disposed on first and second light axes lying in a first common plane substantially normal to said longitudinal axis, said first and second light axes being angularly spaced by substantially 90°, the third and fourth ones of said sources and the third and fourth ones of said light sensing means being respectively disposed on third and fourth light axes lying in a second common plane substantially normal to said longitudinal axis and longitudinally spaced from said first plane, said third and fourth light axes being angularly displaced by substantially 90°, said first and third light axes, and said second and fourth light axes respectively lying in third and fourth common planes with said first and third, and second and fourth light sensing means respectively being on opposite sides of said article.

5. The apparatus of claim 4 wherein each of said light sources is an elongated tube axially longer than the maximum thickness dimension of said article.

6. The apparatus of claim 4 wherein each of said camera tube means is an image dissector having an elongated narrow aperture extending parallel with said longitudinal axis.

7. The apparatus of claim 3 wherein said camera tube means and said light sources are oriented on light axes extending through said article substantially perpendicular to said longitudinal axis, said camera tube means being proportioned and arranged to view an area of the peripheral surface of said article extending between predetermined extremities on either side of said light axis in said perpendicular scanning direction, the light refractive characteristics of said article being such that the light received by said camera tube means from said extremities of said area has a lower brightness level than that received from adjacent said light axis, said scanning means being arranged to scan said extremities whereby edge signals are provided in said output signal respectively responsive to said extremities.

8. The apparatus of claim 7 wherein said camera tube means includes output circuit means for said output signal, and further comprising means coupled to said output circuit means for eliminating said edge signals from said output signal.

9. The apparatus of claim 8 wherein said flaw signals are of relatively short duration having predominantly high frequency components and said edge signals are of relatively long duration having predominantly low frequency components, and wherein said eliminating means includes low band pass filter means coupled to said output circuit means for passing said edge signals and rejecting said flaw signals, and differential amplifier means coupled to said output circuit means and to said low band pass filter means for subtracting the filtered edge signals from the unfiltered output signal thereby to provide output dark line and flaw signals.

10. The apparatus of claim 9 wherein said eliminating means further includes first level detecting means coupled to said differential amplifier means for providing dark line and flaw pulses of predetermined amplitude in response to said output dark line and flaw signals, second level detecting means coupled to said low band pass filter means for providing edge blanking pulses of predetermined amplitude in response to said filtered edge signals, and blanking gate means coupled to said first and second level detecting means for blanking said dark line pulses in response to said edge blanking pulses.

11. The apparatus of claim 10 wherein said eliminating means further includes means coupling said output circuit means to said differential amplifier means for passing said output signal thereto, and coupling means, differential amplifier means and first level detecting means comprising a first channel, said low band pass filter means and second level detecting means comprising a second channel, and signal delay means in said first channel for compensating for the signal delay in said low band pass filter means.

12. The apparatus of claim 11 wherein said delay means is coupled between said first level detecting means and said blanking gate means.

13. The apparatus of claim 12 further comprising retrace pulse generator means, and saw-tooth generator means coupled to said retrace pulse generator means and actuated thereby, said sawtooth generator means being coupled to said scanning means of said camera tube means for energizing the same, and wherein said first channel further includes second blanking gate means coupled to said delay means and said retrace pulse generator means for blanking the delayed dark line and flaw pulses in response to said retrace pulses, and reject pulse generator means coupling said second blanking gate means and said first named blanking gate means for generating pulses of fixed amplitude and duration in response to said delayed dark line and flaw pulses.

14. Apparatus for detecting airlines in cylindrical, substantially transparent glass tubing which is moving longitudinally, said apparatus comprising: four image dissector camera tubes each disposed to view a different quadrant of the peripheral surface of said tubing, each of said camera tubes having means for scanning in a direction perpendicular to the axis of said tubing, each of said camera tubes having an elongated narrow aperture extending parallel with said tube axis; and four sources of diffuse light, each of said light sources being disposed on the side of said tubing opposite from a respective camera tube and illuminating an area of said tubing longer than the length of said scanning and wider than the width of said aperture when projected through said tubing to said light source.

References Cited
UNITED STATES PATENTS

| | | | |
|---|---|---|---|
| 2,866,376 | 12/1958 | Cook | 356—200 |
| 3,096,443 | 7/1963 | Laycak | 356—200 |
| 3,166,627 | 1/1965 | Shaw | 356—200 |
| 3,280,692 | 10/1966 | Milnes et al | 356—200 |
| 3,331,963 | 7/1967 | Lippke | 356—200 |
| 3,359,853 | 12/1967 | Benson et al. | 250—219(DF) |

RONALD L. WIBERT, Primary Examiner

O. B. CHEW II, Assistant Examiner

U.S. Cl. X.R.

250—223